United States Patent Office 2,997,652
Patented Aug. 22, 1961

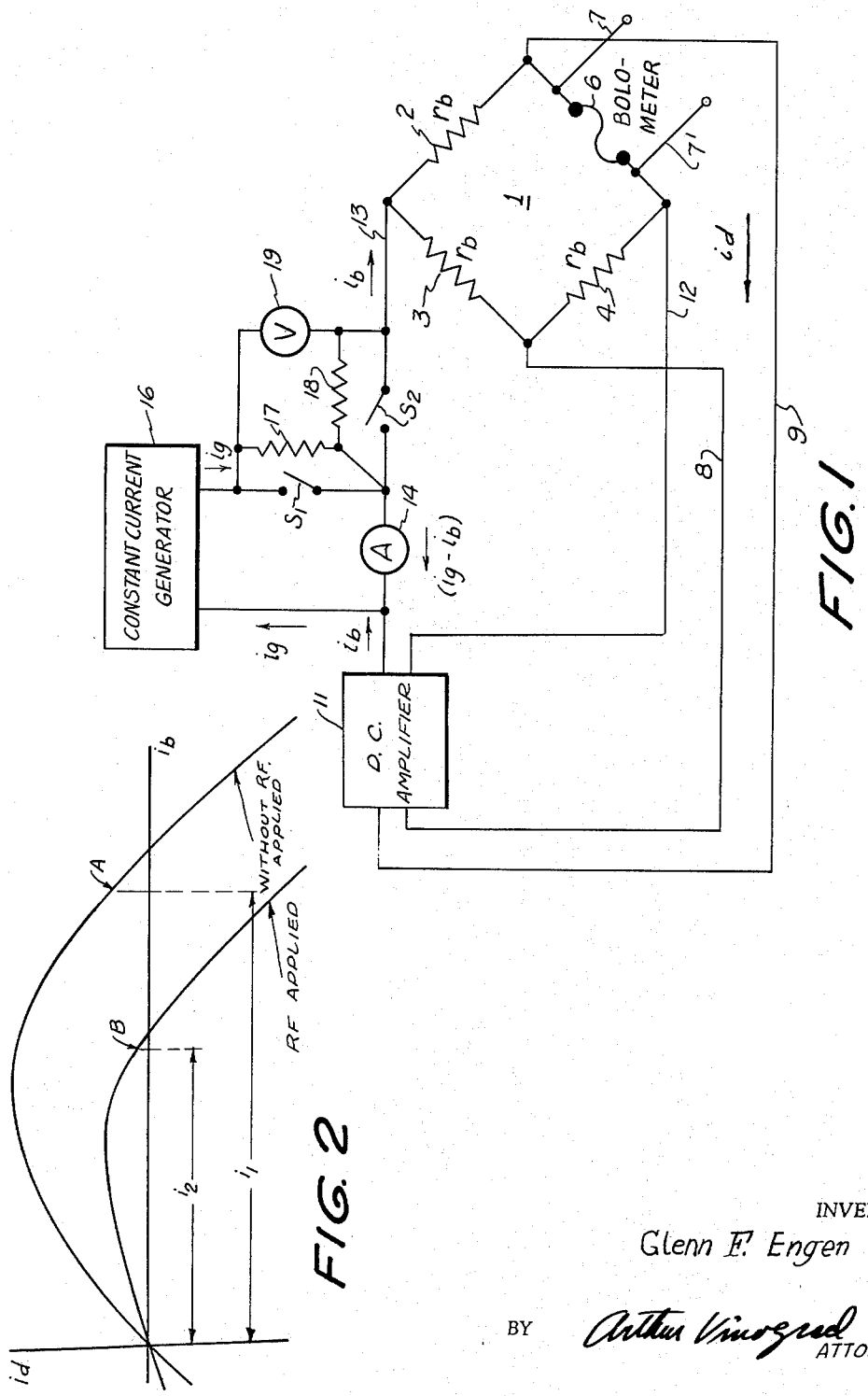

2,997,652
SELF-BALANCING D.C. BOLOMETER BRIDGE
Glenn F. Engen, Boulder, Colo., assignor to the United States of America as represented by the Secretary of Commerce
Filed July 7, 1958, Ser. No. 747,106
3 Claims. (Cl. 324—106)

The present invention is concerned with high-frequency electrical power measurements and more particularly with a self-balancing D.C. bolometer bridge for measuring microwave power.

The bridge circuit of the instant invention combines the desirable self-balancing feature of conventional A.C. ridge circuits with the extreme accuracy of a manually-operated, high-quality D.C. bridge.

One object of this invention is to provide an improved self-balancing D.C. bridge.

Another object of this invention is to provide an improved bolometer bridge.

A further object of this invention is to provide an improved bolometer bridge for measuring microwave power with increased accuracy.

A still further object of this invention is to provide an improved self-balancing microwave power measuring bolometer bridge in which the change in D.C. power supplied to the bolometer element may be measured directly.

Still another object of this invention is to provide a D.C. type microwave power measuring device permitting the use of higher accuracy D.C. measuring techniques.

Other uses and advantages of the invention will become apparent upon reference to the specification and drawings in which:

FIG. 1 is an embodiment of the present invention, and

FIG. 2 is a representation of detector current as a function of bridge current for the Wheatstone bridge shown in FIG. 1.

Referring to FIG. 1, the Wheatstone bridge 1 consisting of equal resistive arms 2, 3, and 4 and having a conventional bolometer 6 mounted in the fourth arm. Leads 7—7' serve to connect bolometer 6 to a source of microwave energy (not shown) the power from said source being the quantity it is desired to measure.

"The word bolometer embraces two subdivisions, viz., barreters, which are normal resistive elements with a positive temperature cofficient of resistance, and thermistors, which are compounded of metallic oxide materials possessing a negative temperature coefficient," Electronics Measurements, page 44, line 4 from the bottom, by Terman and Pettit, McGraw-Hill Book Company, Incorporated (1952).

In a specific example of the embodiment disclosed, any one of a large variety of commercially available thermistors may be used, such as 32PB1 or 32CH1 thermistors provided by the Thermistor Corporation of America.

The unbalance signal is taken from bridge 1 by way of leads 8 and 9 to a high gain, very stable D.C. amplifier 11. Particularly suited for operation as amplifier 11 is a Weston model 1411 "Inductronic" amplifier modified by the addition of a cathode follower to provide the required bridge current $i_b$.

In series with amplifier 11 is an ammeter 14. A constant current generator 16, which may include a second similarly modified "Inductronic" amplifier, supplies a constant current $i_g$ to ammeter 14. The constant current generator 16 in conjunction with ammeter 14 forms a differential ammeter circuit for reading directly the changes in bridge current $i_b$ supplied to bridge 1.

Switches S1 and S2 provide means for including resistors 17 and 18 as well as voltmeter 19 in the circuit for the purpose of measuring changes in both the current and voltage to obtain a power indication. If desired, auxiliary apparatus (not shown) in the form of a dynanometer may be used in conjunction with the voltage and current measurements, giving the product of the voltage and current reading and hence a direct reading of the change in power.

Referring to FIGS. 1 and 2, detector current $i_d$ flows through leads 8, 9 which are connected across one diagonal of Wheatstone bridge 1, while bridge current $i_b$ flows in leads 12, 13 connected across the other diagonal of the bridge. When bridge 1 is unbalanced, detector current $i_d$ is applied to the input of amplifier 11. The detector current is of such polarity as to cause the output of the amplifier, bridge current $i_b$, to either increase or decrease as required to restore bridge balance. For example, if bolometer 6 is selected to be a thermistor, as indicated above, the thermistor will be heated by the current passing through the associated branch of the bridge; and as its temperature increases the resistance of the thermistor will be lowered, approaching that of resistor $r_b$. An operating point will therefore be reached at which an increase in bridge current $i_b$ will reduce the input to amplifier 11 and consequently tend to reduce the bridge current, while a decrease in bridge current $i_b$ will result in a larger amplifier input which will tend to increase the bridge current. The system thus seeks an operating point where the ratio of bridge current $i_b$ to detector current $i_d$ is substantially equal to the amplifier gain. This in effect is negative feedback. For a high-gain amplifier this operating point will be very close to the point of bridge balance; and detector current $i_d$ will be very close but not necessarily equal to zero. The resistance of bolometer 6 will closely approximate the value of resistance $r_b$.

In practice, D.C. amplifiers are usually provided with means for "zero adjustment" and with such a provision it would be possible (ideally) to adjust amplifier 11 so that the operating point and the bridge balance point would exactly coincide. However, this would be true for only one value of bridge current $i_b$; and since in operation the bridge current changes when R.F. energy is applied to bolometer 6, as indicated below, it is preferable to make the zero adjustment such that an extrapolation of the transfer characteristic of the amplifier yields the condition of zero output for zero input.

The operation indicated above is essentially the same when either a thermistor or barreter is used, i.e., whether bolometer 6 has either positive or negative temperature coefficient, except that the polarity of either bridge current $i_b$ or detector current $i_d$ but not both currents must be reversed when going from one type of element to the other.

When switches S1 and S2 are in the closed position, the R.F. power applied to bolometer 6 is, assuming exact balance of bridge 1, as follows:

$$P_{rf} = \frac{r_b}{4}(i_1^2 - i_2^2) \qquad (1)$$

$$= \frac{r_b}{4}(i_1 + i_2)(i_1 - i_2) \qquad (2)$$

$$= \frac{r_b}{4}(2i_1 - \Delta i)\Delta i \qquad (3)$$

where
$r_b$ = resistance in each arm of bridge 1
$P_{rf}$ = R.F. power applied to bolometer 6
$i_1$ = bridge current $i_b$ when no R.F. power is applied to bolometer 6
$i_2$ = bridge current $i_b$ when R.F. power is applied to bolometer 6
$\Delta i = (i_1 - i_2)$.

The operation of the system in FIG. 1 is as follows. The functional dependence of the detector current $i_d$, upon the bridge current $i_b$, has the general form shown in FIG. 2. Before the application of R.F. energy the system seeks the operating point A where, as explained above, the ratio of bridge current $i_b$ to detector current $i_d$ equals the amplifier gain. For a high-gain amplifier, the amount of unbalance will be small and the resistance of the bolometer will very nearly equal that of resistance $r_b$. Constant current generator 16 is adjusted until ammeter 14 reads zero, at which point the constant current generator provides a current equal $i_g$ in magnitude and opposite in direction to $i_1$.

When R.F. energy is applied to bolometer 6, additional heating takes place which tends to unbalance bridge 1 through its effect on the bolometer resistance. If, for example, bolometer 6 is a thermistor, which possess a negative temperature coefficient, the resistance of the bolometer is decreased, causing a large unbalanced condition of the bridge. Detector current $i_d$ therefore increases. The system tends to correct this unbalance by reducing bridge current $i_b$ by negative feedback, i.e., an increase in current $i_d$ decreases current $i_b$, and consequently, the D.C. power supplied to the bolometer. As the temperature of the bolometer decreases, its resistance increases, gradually approaching the resistance of resistor $r_b$. When the bolometer has a resistance very close to that of resistor $r_b$ operating point B is obtained, and the bridge current $i_b$ is equal to $i_2$, as shown in FIG. 2.

When R.F. energy is applied to bolometer 6, ammeter 14 reads $(i_1 - i_2) = \Delta i$ or the change in bridge current $i_b$. With $i_1$ determined from the output of generator 16 and a knowledge of the resistance $r_b$, the R.F. power $P_{rf}$ applied to bolometer 6 may be obtained from Equation 3 given above.

In order to measure retracted power directly switches S1 and S2 may be opened to include equal resistors 17 and 18 as well as voltmeter 19 in the measuring circuit. With the resistances 2, 3, and 4 of bridge 1 as well as the resistance of bolometer 6, when the bridge is balanced, equal to $r_b$ the total bridge resistance is $r_b$. Assigning a value of $$r_a = \frac{r_b}{4}$$

to each of resistors 17 and 18 the voltage drop measured by voltmeter 19 with high-frequency energy applied will be $$V_{19} = i_g r_a + i_2 r_a = \frac{r_b}{4}(i_1 + i_2)$$

where $i_1$, $i_2$ and $i_g$ are the currents previously defined. From Equation 2 above it can be seen that the retracted power is given directly by the product of the voltmeter and ammeter readings.

At low power levels $\Delta i$ [Equation 3 above] is small compared with $2i_2$ and the retracted power is to a close approximation proportional to the reading of ammeter 14 with switches S1 and S2 closed.

It will be apparent that the embodiment shown is only exemplary and that various modifications can be made in construction and arrangement within the scope of invention as defined in the appended claims.

What is claimed is:

1. A circuit for measuring radiant energy comprising a Wheatstone bridge, a bolometer positioned in at least one arm of said bridge to be energized by the radiant energy to be measured, a direct current amplifier, means for connecting the input of said direct current amplifier across a first diagonal of said bridge, means for applying the output of said direct current amplifier across a second diagonal of said bridge to provide a direct current bridge signal, whereby a direct current detector signal is developed across said first diagonal having a magnitude dependent upon the level of radiant energy applied to said bolometer, said bridge signal having a magnitude such that the ratio of the magnitude of said bridge signal to said detector signal is substantially equal to the gain of said direct current amplifier, and means for measuring the magnitude of said bridge current signal.

2. A circuit for measuring radiant energy comprising a Wheatstone bridge, a bolometer positioned in at least one arm of said bridge to be energized by the radiant energy to be measured, a direct current amplifier, means for connecting the input of said direct current amplifier across a first diagonal of said bridge, means including a direct current measuring device for applying the output of said direct current amplifier across a second diagonal of said ridge to provide a direct current signal, whereby a direct current detector signal is developed across said first diagonal having a magnitude dependent upon the level of radiant energy applied to said bolometer, said bridge signal having a magnitude such that the ratio of the magnitude of said bridge signal to said detector signal is substantially equal to the gain of said direct current amplifier, a constant direct current generator having an output substantially equal in magnitude to said bridge current when radiant energy is not applied to said bolometer, and means for applying the output of said constant current generator across said current measuring device in opposite polarity to said bridge current.

3. A circuit for measuring radiant energy comprising a Wheatstone bridge, a bolometer positioned in at least one arm of said bridge to be energized by the radiant energy to be measured, a direct current amplifier, means for connecting the input of said direct current amplifier across a first diagonal of said bridge, means including a direct current measuring device and a first impedance element for applying the output of said direct current amplifier across a second diagonal of said bridge to provide a direct current bridge signal, whereby a direct current detector signal is developed across said first diagonal having a magnitude dependent upon the level of radiant energy applied to said bolometer, said bridge signal having a magnitude such that the ratio of the magnitude of said bridge signal to said detector signal is substantially equal to the gain of said direct current amplifier, a constant direct current generator having an output substantially equal in magnitude to said bridge current when radiant energy is not applied to said bolometer, means including a second impedance element for connecting the output of said constant current generator across said current measuring device in opposite polarity to said bridge current, and a voltage measuring device connected across said first and second impedance element.

References Cited in the file of this patent

UNITED STATES PATENTS

| | | |
|---|---|---|
| 2,437,449 | Ames et al. | Mar. 9, 1948 |
| 2,673,960 | Doblmaier | Mar. 30, 1954 |
| 2,697,787 | Vosburgh | Dec. 21, 1954 |
| 2,799,826 | Eberle | July 16, 1957 |
| 2,854,629 | Thirup | Sept. 30, 1958 |

UNITED STATES PATENT OFFICE
CERTIFICATE OF CORRECTION

Patent No. 2,997,652                                      August 22, 1961

Glenn F. Engen

It is hereby certified that error appears in the above numbered patent requiring correction and that the said Letters Patent should read as corrected below.

Column 4, line 22, for "ridge" read -- bridge --; same line 22, after "current" insert -- bridge --.

Signed and sealed this 2nd day of January 1962.

(SEAL)
Attest:

ERNEST W. SWIDER
Attesting Officer

DAVID L. LADD
Commissioner of Patents

USCOMM-DC